Jan. 8, 1963   P. T. BARNES ETAL   3,072,020
PROPELLANT SUPPLY SYSTEM FOR ROCKETS AND THE LIKE
Filed Jan. 9, 1961   3 Sheets-Sheet 3

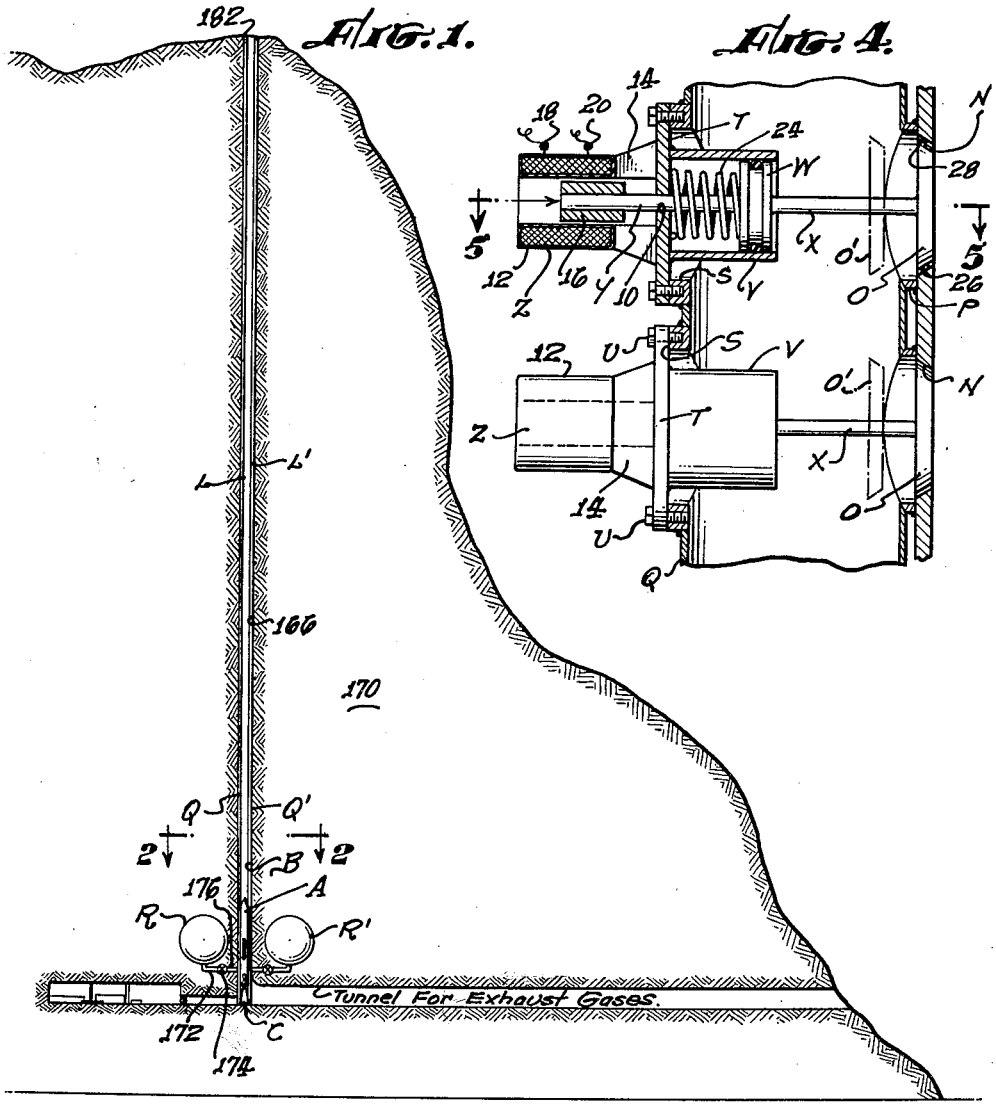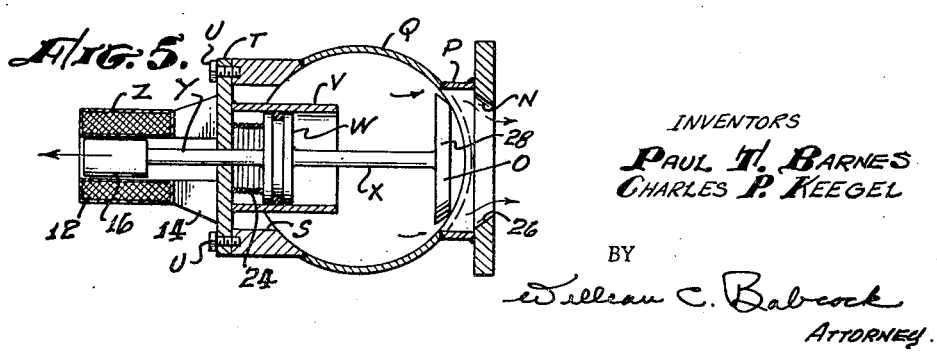

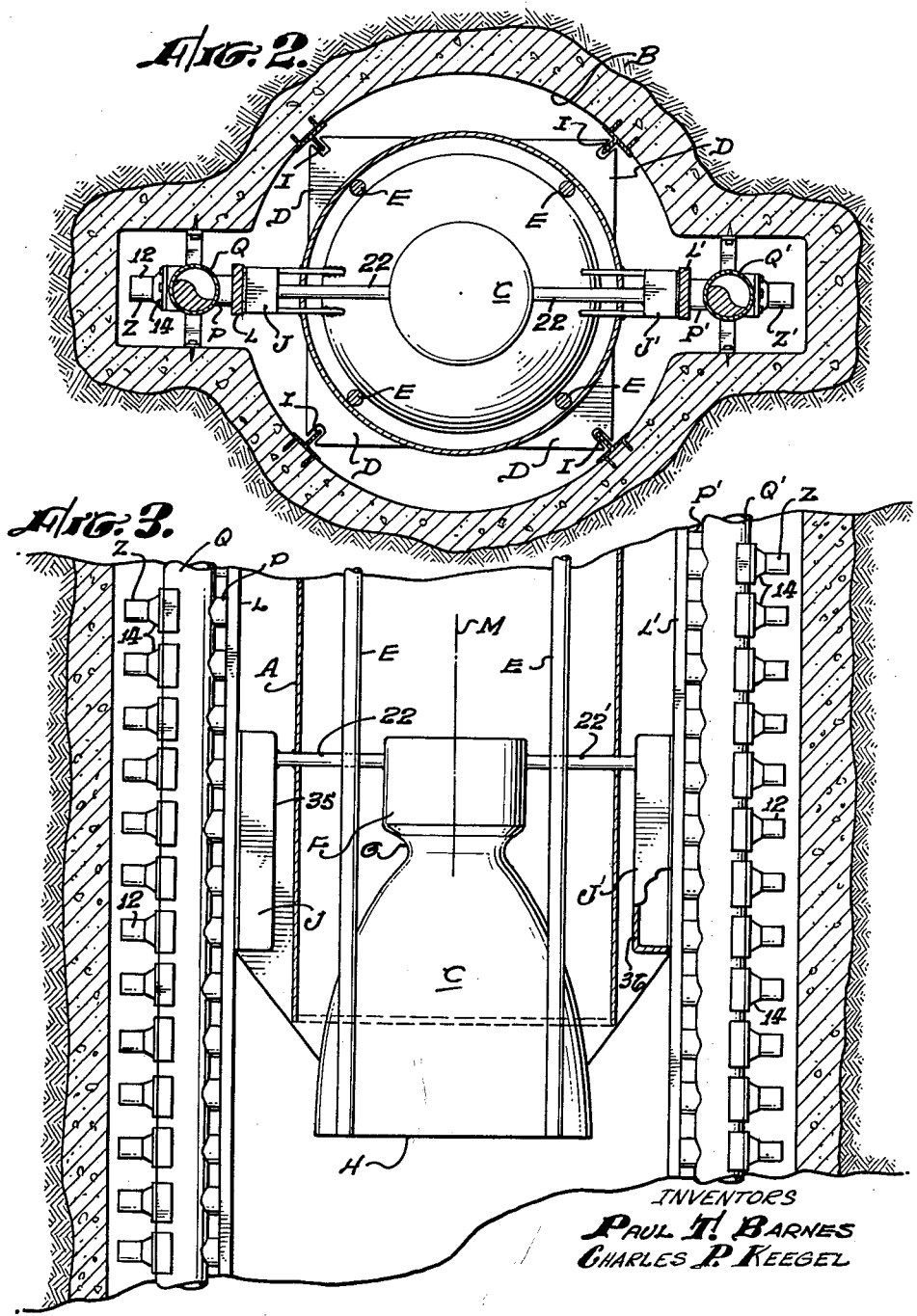

INVENTORS
PAUL T. BARNES
CHARLES P. KEEGEL

BY
William C. Babcock
ATTORNEY.

United States Patent Office 3,072,020
Patented Jan. 8, 1963

3,072,020
PROPELLANT SUPPLY SYSTEM FOR ROCKETS
AND THE LIKE
Paul T. Barnes, China Lake, Calif. (3189 Duffy St., San Bernardino, Calif.), and Charles P. Keegel, 1721 S. 14th St., Las Vegas, Nev.
Filed Jan. 9, 1961, Ser. No. 81,513
8 Claims. (Cl. 89—1.7)

The present invention relates generally to a propellant supply system for a vehicle powered by a jet-propulsion engine, and more particularly to a system in which the propellants for the engine are supplied from a stationary source exterior of the vehicle adjacent a fixed course or a portion thereof to be traversed by the vehicle.

One of the major fields of interest relative to jet-propulsion engines is that of rockets. Heretofore a rocket has been defined and considered to be a self-contained unit; that is, one in which all of the elements necessary for successful operation thereof are contained therein. Such elements include the propellants to propel the unit. In most instances the propellant is comprised of two components; a combustible product, and an oxidizer which facilitates the burning thereof, and these propellants may be either in the gaseous, liquid or solid form. Also, the propellant may be either a monopropellant or a bipropellant.

A monopropellant is one in which the fuel and oxidizer are combined into one substance, such as a mixture of ethyl alcohol and hydrogen peroxide, or nitromethane. A bipropellant is one in which the fuel and oxidizer are normally stored in separate containers or compartments, and are brought together at a predetermined rate in the combustion chamber of the rocket just before these components ignite. Burning of the fuel is accompanied by generation of high velocity exhaust gases. This discharge of gases at high velocity creates an unbalanced force which serves as the primary thrust power that drives the rocket engine.

During the development of rockets and the like. the trend has been to evolve rockets of greater and greater range, which obviously require engines capable of generating increasingly greater thrust power. The greater the thrust power of a rocket engine for a sustained period of time, the larger the propellant storage facilities required on the rocket that accordingly increases the size and weight of the rocket unit until it assumes huge proportions.

One highly undesirable aspect of the increasing size and weight of rockets in attempting to extend the range as well as the thrust power thereof, is that a substantial percentage of the propellant carried by the rocket is expended in its acceleration from a stationary position to a desired velocity within a limited distance from take-off, which may be as low as one hundred feet. Thus, prior to the devising of the present invention, an unsatisfactory design situation prevailed in which larger and heavier rockets were being evolved which carried greater quantities of propellant but with a substantial percentage of this propellant being consumed before the rocket traveled a few hundred feet after take-off. A further disadvantage found in previous rocket designs is that as the rocket increases in size and weight it becomes increasingly difficult to handle when traveling at relatively low speed such as prevails just after take-off.

A primary object in devising the present invention is to provide a stationary propellant supply system for a rocket engine which is adapted to transfer either a monopropellant or a bipropellant in gaseous or liquid form to the engine at a desired rate and pressure, both when the engine is stationary as well as when moving, to substantially increase the total impulse of the unit on which the rocket engine is mounted with but a slight increase in the weight of the unit. Total impulse as used herein is in pound-seconds and is the product of the thrust in pounds by the rocket engine by the duration in seconds that the thrust lasts.

Another object of the invention is to provide a track-guided rocket engine that can travel either vertically, horizontally, or along an inclined path, and in this capacity supply a re-usable engine for the first stage in propelling a vehicle or body, which is quite important economically.

Yet another object of the invention is to provide a multi-stage rocket in which the velocity at the termination of the first stage is substantially increased without the necessity of increasing the size of the rocket, and with but a slight increase in the weight thereof.

A further object of the invention is to supply a multi-stage rocket and associated propellant system for the first stage thereof by which the payload-carrying capacity of the rocket is materially increased, without increasing the size of the rocket, and with only a slight increase in the weight thereof.

Another object of the invention is to provide a propellant system that materially increases the total impulse of the first stage of a rocket that is subsequently powered by additional stages in which atomic energy furnishes the motivating power.

An additional object of the invention is to provide a propellant supply system that not only supplies propellant to a rocket engine during the time the unit of which the rocket forms a part is traversing the first portion of a predetermined course, but in addition provides a launching guide to constrain the unit during its initial period of travel and assures that it will follow said course while under such constraint.

Still a further object of the invention is to provide a stationary propellant system that is particularly adapted for use with rocket engine powered sleds which traverse a horizontal course, and one that permits the testing of engines under such conditions with greater accuracy and efficiency for the sleds are of constant weight inasmuch as they carry no propellant.

Another object of the invention is to supply a stationary propellant system in which the associated components are so located on a rocket that during the time propellant is supplied from the system to the rocket, the metal defining the various stages of the rocket is subjected to tension, and as a result, thinner sheet material can be used in the fabrication of the rocket than possible if the same sheet material were under compression.

Yet a further object of the invention is to supply a stationary system by means of which not only liquid propellants can be transferred to a rocket motor either when it is stationary or in motion, but a system that permits a liquid or gaseous coolant to be discharged to the rocket engine during the same time propellant is discharged thereto.

Still another object of the present invention is to provide a stationary propellant supply for the first stage of a rocket that is particularly adapted for use in silos, shafts, and along the sheer face of a cliff, as well as in conventional launching frameworks to supply literally an unlimited amount of propellant to the first stage of the rocket to obtain a desired acceleration from a stationary position to a position at a desired elevation thereabove, with the rate at which the propellants are supplied from a location remote therefrom which is impossible with previously available rocket engines and launching equipment. Automatic or programmed control may be made available at the remote location.

These and other objects and advantages of the present invention will become apparent from the following description thereof, and from the accompanying drawings in which:

FIGURE 1 is a combined vertical cross-sectional and side elevational view of the stationary propellant supply system for a rocket engine when the system is located in a deep shaft;

FIGURE 2 is a transverse cross-sectional view of the propellant supply taken on line 2—2 of FIGURE 1;

FIGURE 3 is an enlarged side elevational view of the lower end of the rocket showing the engine portion thereof, as well as a portion of the stationary propellant supply system;

FIGURE 4 is a longitudinal cross-sectional view of a portion of one side of the stationary propellant supply system illustrating one of the valve mechanisms associated therewith;

FIGURE 5 is a transverse cross-sectional view of a portion of the stationary propellant supply system taken on line 5—5 of FIGURE 4;

FIGURE 6 is a diagrammatic view of a portion of the manner in which the stationary propellant supply system cooperate with a conventional rocket engine to furnish propellants to the same during the initial period of its operation; and FIGURE 7 is a fragmentary perspective view of an electrical wiring diagram showing the manner in which the fluid discharge valves are sequentially actuated as one of the transfer chambers passes thereby.

With further reference to the drawings, the terminal arrangement of the invention is shown in FIGURE 1. A rocket A is vertically disposed in the lower portion of shaft B. Rocket A is adapted to be propelled upwardly through shaft B by a rocket engine C, best seen in FIGURE 3. Body portions D of rocket A (FIGURE 2) are preferably slidably engaged by a number of spaced, parallel upwardly extending rails E which are held in fixed positions in the shaft B. The rails E serve to constrain the rocket A to strictly vertical movement as it travels through shaft B. Although the stationary propellant supply system may be employed equally well with rails E that are horizontally disposed or angularly inclined and the rocket A or other vehicles or bodies such as sleds or the like, propelled therealong.

The body portion of a rocket or other airborne vehicle propelled by a jet engine must be as lightweight as possible, and is normally formed from a lightweight rigid frame that is covered by a thin layer of skin or metal, or other material which is resistant to the environment in which the rocket will travel. Frequently a number of separate frameworks are provided, each covered with a thin layer of material, with the covered frameworks being disposed in end-to-end relationship to define a multistage rocket. From experience it has been found that a framework covered with a thin layer of material as above described, has substantially more strength in tension than under compression. Accordingly, it is desirable to mount the engine C on the lower end portions of a number of upwardly extending members E, best seen in FIGURE 3, the upper end portions of which members are affixed to the upper end portion of the rocket, or if the rocket is of multi-stage construction, to the upper end portion of the first stage or other stages thereof.

The rocket engine C may take a variety of forms, depending upon the use for which it intended, but in general it includes a combustion chamber F, throat G, and an exit H for the hot exhaust gases. To minimize the temperature to which the material defining the engine C is subject, it is common practice to form the same with a double shell as seen in FIGURE 6, through which the propellant circulates for cooling purposes, prior to consumption of the propellant in the combustion chamber F.

The rocket A shown in FIGURE 1 is basically conventional in design, but has been modified for use with the stationary propellant supply system described hereinafter.

The rocket A, as is common with such devices, is self-contained; that is, all of the components necessary for operation thereof in flight, including propellant, are contained therein. However, the rocket A differs from those devised heretofore in that in addition to those components necessary for flight, it also has affixed thereto, at least one fluid transfer chamber J which is in sliding and sealing contact with a flat elongate plate L that is located outwardly from the center line of the course M the rocket will traverse. Of course, if the path M is horizontal or on an inclined plane, the plate L could extend the length thereof if desired.

Plate L, as shown in FIGURES 4 and 5, has a number of fluid discharge ports N formed therein that are normally closed by valve members O. Each port is in communication with a transversely disposed nipple P projecting outwardly from plate L. Each nipple P is connected to a tubular shell Q which is parallel to the course M, as shown in FIGURE 3, and serves to conduct fluid from a reservoir R to the ports N.

A number of circular openings S are formed in tubular shell Q in transverse alignment with nipples P. Each opening S has a closure plate T extending thereacross and removably affixed to shell Q by bolts U or the like. Cylinders V are affixed to closure plates T and extend inwardly into shell Q, as may best be seen in FIGURE 4. Each cylinder V has a piston W slidably and sealingly disposed therein, with each piston being connected by a valve stem X to one of the valve members N. A number of actuating rods Y are provided which are affixed to the faces of pistons W opposite the faces from which the stems X project. Each rod Y projects through a bore 10 formed in one of the closure plates T to actuating means Z, which means are preferably supported from the exterior surface of the closure plate. The actuating means Z will be described in detail hereinafter. When one of the actuating means Z is energized, it moves the piston W, valve stem X and valve member O associated therewith to a position where the valve member O is separated from the port N it normally closes, and fluid can flow outwardly from the tubular shell Z through the opened port N. The position of one of the valve members W when in an opened position is shown in phantom line in FIGURE 4 and identified by the notation O'.

One form of actuating means Z is shown in detail in FIGURE 4, and it will be seen to include a solenoid 12, the longitudinal axis of which is in coaxial alignment with valve stem X, with one end of the solenoid being connected by a conventional bracket 14 to the exterior surface of one of the closure plates T. An annulus-shaped armature 16 fabricated from a magnetically attractible material is rigidly affixed to the end portion of rod Y that projects beyond the closure plate T. Armature 16 is of such transverse cross section as to be movable within solenoid 12. Two terminals 18 and 20 are formed in solenoid 12, and when electrical energy is supplied to these terminals the solenoid is energized, with the armature 16 being moved relative thereto in a direction away from closure plate T. This movement of armature 16 effects concurrent movement of rod Y, piston W, valve stem X and valve member O to move the valve member from a first position shown in solid line in FIGURE 4 to the second position O' shown in phantom line. When a valve member O occupies this second position fluid can flow from the tubular sell Q into the transfer chamber J.

After fluid has entered the transfer chamber J it is discharged through a conduit 22 to the combustion chamber F, as shown in FIGURE 3. A helical spring 24 is provided for each cylinder V, with the spring encircling that portion of rod Y situated within the cylinder V. One end of spring 24 abuts against the interior face of piston W and the other end thereof against the interior face of closure T. When solenoid 12 is electrically energized and the armature 16 moved to the left (FIGURE 4), the spring 24 is compressed by the movement of piston W.

The compressed spring 24 at all times tends to move piston W to the right and return valve member O to a seated position on port N.

Each of the fluid discharge ports N is formed with a tapered face 26 which is slidably and sealingly engaged by a tapered surface 28 defined on the circumferentially extending portion of the valve member O, as best seen in FIGURE 4. The transfer chamber J shown on the left side of the rocket engine C in FIGURE 3, has two identical, laterally spaced, parallel side walls 30 and 30a (FIGURE 7) which are connected by end walls 32 and 32a. One side 34 of chamber J is open and is at all times in communication with the ports N as the chamber moves longitudinally along plate L.

The side of transfer chamber J opposite side 34 is closed by a longitudinally extending plate 35 in which an opening is formed that communicates with the conduit 22 extending to the combustion chamber F. In FIGURE 3 it will be seen that as the rocket engine C and the transfer chamber J move longitudinally along plate L, the transfer chamber will sequentially be in communication with the ports N formed in the plate. It is desirable that the valve members O normally closing the fluid discharge ports N be in the second positions O' only when the transfer chamber J is in communication with the opened ports.

The sequential opening of the valve members O to permit fluid flow from the tubular shell Q through discharge port N can be effected by positioning a number of normally open electrical switches 36 along an edge portion of plate L. Each switch 36 includes a contact 38 and a blade 40 that normally is out of engagement with this contact. Contact 38 is joined to one terminal 18 of solenoid 12 by an electrical conductor 42. The other terminal 20 of solenoid 12 is connected by an electrical conductor 44 to a junction point 46 in an electrical conductor 48. Blade 40 is connected by an electrical conductor 50 to a junction point 52 in an electrical conductor 54. Conductors 48 and 54 extend longitudinally along plate L and a sequence of junction points 46 and 52 are formed as a part thereof. These additional junction points 46 and 52 are connected by additional conductors 44 and 50 and switches 36. Conductors 48 and 54, as shown in FIGURE 7, are connected to a source of electrical energy 56. Whenever a switch 36 is placed in the closed position by movement of blade 40 into engagement with contact 38, the electrical solenoid 12 is energized, and the valve member O associated therewith is moved to the open position O' (FIGURE 4) to permit discharge of fluid through port N.

In the operation of the invention, it is desirable that each port N should open sequentially after the transfer chamber J has moved to a position where the port is in communication with the upper interior portion thereof. It is also desirable that each of the ports N close sequentially as the transfer chamber J moves to a position where the interior portion thereof is not in full communication with one of the ports.

When one of the solenoids 12 is electrically energized, there is a certain time lag during which the valve member O associated therewith moves to the fully open position O' shown in phantom line in FIGURE 4, and before fluid discharges through the newly open port N to transfer chamber J. Consequently, it is desirable that each of the switches 36 sequentially close prior to the time the transfer chamber J is in full communication with the particular port N associated with the switch that is to close. Thus, each of the valve members O starts to open before the transfer chamber J is in a position to receive fluid from the particular port N associated with that valve member. However, during this time the transfer chamber J is moving upwardly, as seen in FIGURE 3, and by the time this particular port N is completely open the transfer chamber J will be in full communication therewith. This advance closing of the switches in sequence is conveniently accomplished due to the provision of an elongate actuating member 58 supported longitudinally on the transfer chamber J which projects forwardly thereon and overhangs the edge surface of plate L on which switches 36 are mounted, as can be seen in FIGURE 7. When the end portion 60 of actuating member 58 contacts the blade 40, blade is moved from its normally open position into engagement with contact 38. Face 62 of actuating member 58 then passes over the blade 40 and holds it in engagement with contact 38. Consequently, the switch 36 will be held in the closed position to permit discharge of fluid from the port N into transfer chamber J during the time the transfer chamber passes this particular port.

As mentioned hereinabove, each of the valve members O require a certain length of time in which to move from the closed to the open position, and this is also true when each valve closes and the valve member O moves from the second and closed position O' as shown in FIGURE 4. The rear end 64 of the actuating member 58 is located a substantial distance 66 from the rear end wall 32 of the transfer chamber J. Thus, when the rocket engine C is moved relative to the plate L, the blade 40 of each electrical switch 36 ceases to be held in the closed position on contact 38 prior to the time the end 32 of the transfer chamber is in a position to pass a portion of one of the ports N. This distance may be computed as follows. The time it takes one of the springs 24 to move valve member O from the open to the closed position (FIGURE 4) is determined by experiment. Also, by computation and experiment, the rate of acceleration of rocket engine C and transfer chamber J relative to the plate L can be determined. The distance 66 can be determined and is so selected that each valve member O is completely closed before the end 32a of the transfer chamber starts to pass a portion thereof. The distance 66 will vary, depending upon the rate at which the rocket engine C is accelerating. Consequently, a number of actuating members 58 of varying length may be provided to vary the distance 66, as well as the distance that these members will project beyond end piece 32 of transfer chamber J. Accordingly, each of the actuating members is preferably removably affixed to brackets 68 which are mounted on side wall 30 of chamber J, as best seen in FIGURE 7.

The invention above described could be used to supply propellant to the engine C only if the propellant is a monopropellant. In most instances it will be found desirable to use a second plate L' that is slidably and sealingly engaged by a second transfer chamber J', together with the associated elements shown in FIGURE 7. As plate L' and transfer chamber J' and all elements associated therewith are of the same structure as those previously described in conjunction with plate L and transfer chamber J, the second plate and chamber will not be described in detail but will be indicated on the drawings by the letters L' and J', with the identifying numerals for the elements in combination therewith also having a prime affixed thereto.

An installation as shown in FIGURES 2 and 3 is quite versatile in use, for the plate L and transfer chamber J may be used to supply either a monopropellant or the oxidizer portion of a bipropellant to the engine C. If a bipropellant is used, that portion thereof supplied to the engine C through the transfer chamber J would normally be the propellant, with the oxidizer being supplied to the engine through the transfer chamber J'. Should it be desired to use a monopropellant with the installation shown in FIGURES 2 and 3, the first transfer chamber J can be used to receive the discharge of monopropellant from the stationary plate L, and the second transfer chamber J' used to receive a liquid coolant from the plate L'.

The engine C, as shown in FIGURE 3, could be used to propel the rocket A shown in FIGURE 1, or could be used to propel a body (not shown) that carries no fuel supply thereon. Such a body might be a sled that is propelled along a horizontal or inclined course. The use of the present stationary propellant supply system is in its simplest form when the vehicle or body propelled by the engine C carries no propellant supply and the entire propellant source for the rocket engine is derived from propellant supplied to the transfer chambers J and/or J'.

Except for sled constructions or other structures designed primarily for the testing of rocket engines, the stationary propellant supply system shown in FIGURES 2 and 3 will normally be used to supply propellants to the rocket A to generate a sufficient static thrust or boost to lift the rocket from its supported position and thereafter propel it a predetermined distance along a desired course. Therefore, the rocket A must be so constructed that fluids are supplied thereto through conduits 22 and 22' to start the rocket on the initial portion of its flight, and just prior to completion of this portion of the flight the fuel supply is switched to containers aboard the rocket that thereafter furnish propellant to the rocket engine for propulsion purposes.

The stationary propellant supply system shown in the drawings may be incorporated in rockets A of conventional design but in which modifications have been made as will be described hereinafter. A schematic diagram of the manner in which a conventional rocket can be transformed to one in which propellants are supplied for the initial portion of its flight is shown in FIGURE 6. The rocket A that is so transformed will have a transfer chamber J that is in sliding sealing contact with an elongate plate L of the structure shown in FIGURES 2 and 3. The conduit 22 extends from an opening in the transfer chamber J to a valve 70 to be described hereinafter. One leg of a tee fitting 72 is conencted to the discharge side of valve 70, with the opposite leg of the tee being connected to a conduit 74 and the third leg being connected to a conduit 76. Conduit 74 extends to one leg of a second tee fitting 78, with the second leg of this tee being connected to a conduit 80 and the third leg thereof being joined to a conduit 82. A propellant tank 84 is provided in the body of the rocket A and a conduit 86 leads therefrom to the inlet of a valve 88, with the outlet of valve 88 being connected to conduit 80. Valve 88 is normally closed. Conduit 82 is connected to the suction side of a first pump 90, with the discharge side of this pump being connected to a conduit 92 that extends to a control valve 94. The discharge from the control valve 94 is through conduit 96.

The rocket engine C is formed with double walls 98 and 100 that cooperatively define a closed space 102 therebetween, which space is in communication with a nozzle 104 through which fluid propellant can be discharged into the combustion chamber F of the rocket engine. Space 102 is also in communication with a conduit 76 that leads from the forward portion of the rocket engine C to the third leg of the tee fitting 72. When propellant is consumed in combustion chamber F and transformed to high velocity exhaust gases, this transformation is accomplished with the generation of intense heat. To minimize the high temperature to which the wall 100 will be subjected, it is a common expedient to regeneratively cool this wall by causing liquid propellant to flow therethrough prior to discharge thereof through nozzle 104. The advantage of using the fluid propellant to cool the wall 100 of rocket engine C is that the heat content of the propellant is increased prior to discharge thereof through nozzle 104, and as a result, a minimum portion of the heat generated in the combustion chamber F will be lost in transforming the propellant from the liquid to the vapor state. It will be seen in FIGURE 6 that so long as the valve 88 remains closed, all propellant discharged into the transfer chamber J will flow therefrom to the suction side of the pump 90, through conduit 76 to nozzle 104.

The propellant pump 90 is concurrently driven with an oxidizer pump 106 by a steam turbine 108. Pumps 90 and 106 are driven by turbine 108 by means of drive shafts 110 and 112 respectively. The rocket A includes a steam generator 114 in the form of a hollow shell. A steam discharge conduit 116 extends from generator 114 to the inlet side of the turbine 108. Discharge of steam and other condensation products from turbine 108 is effected through a conduit 118 leading therefrom to the ambient atmosphere. Steam generator shell 114 has openings formed therein that communicate with two conduits 120 and 122. Conduit 120 is connected to the discharge side of a normally closed valve 124, and the inlet side of valve 124 has a conduit 126 extending therefrom to communicate with the interior of a container 128 in which an unstable chemical compound 130 is stored. Conduit 122 communicates with a second container 132 in which a catalyst 134 is stored. When the compound 130 and catalyst 134 are brought together a vigorous decomposition of the compound 130 results, which is accompanied by the formation of steam.

A reservoir 136 is included as a part of the rocket A and serves to store air or other gas in a highly compressed state. A discharge conduit 138 extends from reservoir 136 to terminate at the inlet of a normally closed valve 140. A conduit 142 is connected to the discharge outlet of valve 140. Two laterals 144 and 146 extend from conduit 142 to communicate with the interior of the shells 128 and 132 respectively. When valve 140 is open, the high pressure air or gas discharges from reservoir 136 to the two laterals 144 and 146 to force the unstable chemical compound 130 and catalyst 134 into the confines of the steam generator 114 at a sufficiently constant rate for these materials to generate steam. Valve 124 is a throttling valve which regulates the rate at which the unstable chemical compound will be discharged into the steam generator 114.

Rocket A also includes a fluid oxidizer storage tank 150 having a discharge conduit 152 extending therefrom to the inlet side of a normally closed valve 154. A T fitting 156 is provided, one leg of which is connected by a conduit 158 to the discharge side of valve 154, with the opposite leg of T 156 being connected by a conduit 160 to the suction side of the oxidizer pump 106. The third leg of T 156 is connected by a conduit 162 to the discharge side of a valve 164. The inlet side of the valve 164 is connected to conduit 22' that extends to the second transfer chamber J' which is in sliding sealing contact with plate L'. The tubular shell Q, shown in detail in FIGURES 2 and 3, is shown in FIGURE 1 as being located within the confines of a deep shaft 166 that is of substantial length and could be formed in a mountain such as Mount McKinley in the State of Alaska.

The stationary propellant reservoir R is located deep within the mountain 170 (FIGURE 1), or other desired location. A discharge conduit 172 extends from reservoir R to a normally closed valve 174. A conduit 176 leads from the discharge side of valve 174 to the lower interior portion of tubular shell Q.

If the propellant stored in reservoir R is under high pressure and is to be discharged therefrom as a gas to the tubular shell Q, the above described equipment is sufficient to effect such discharge. The high pressure on the propellant in reservoir R will assure discharge thereof to the tubular shell Q when the valve 174 is placed in the open position. However, if the propellant in reservoir R is in a liquid form, a power-driven pump 180 must normally be provided, and inserted in the conduit 176. Pump 180 is required to discharge the liquid propellant from reservoir R into the tubular shell Q against the high hydrostatic head therein during the time the transfer chamber J is being supplied with propellant.

The upper end of tubular shell Q is closed by a cap 182 or other suitable means. If shell Q is of substantial height it may be desirable to locate the reservoir R and pump 180 near the top thereof, such as in a concealed position adjacent the cap 182. Liquid propellant, irrespective of the location of reservoir R and pump 180, must be discharged into shell Q to fill the same prior to the time shell Q and associated equipment shown in FIGURES 2 and 3 is used to supply propellant to the engine C during a predetermined portion of its flight. The advantage of having reservoir R and pump 180 located adjacent the cap 182 is that the discharge of liquid propellant to tubular shell Q would be against a minimum hydrostatic head.

A stationary oxidizer reservoir R' is provided, and like reservoir R, has a conduit 172', valve 174', pump 180' and conduit 176' associated therewith. (By use of the above mentioned assembly, either a gaseous or liquid oxidant can be supplied from reservoir R' to the tubular shell Q'.) This also applies to propellant.

In FIGURE 6 it will be seen that a conduit 190 extends from the discharge side of pump 106 to a control valve 192. The discharge side of valve 192 is connected to a conduit 194 that leads to a nozzle 196 in combustion chamber F. A by-pass conduit 198 extends from conduit 162 to conduit 190, which latter has a normally closed valve inserted therein, generally designated by the numeral 200.

The size of the reservoir R and oxidant reservoir R' may differ, as will the side of the transfer chambers J and J', dependent upon the type of propellant and oxidant employed. For instance, if hydrogen and oxygen are used, eight pounds of oxygen must be provided for each pound of hydrogen delivered to combustion chamber F. It will also be apparent that the ports N in plate L must be of such cross section that at the lowest pressure which may be exerted on the fluid in tubular shell Q, the rate of discharge of this fluid flow through ports N as they sequentially open and close to transfer chamber J will be greater than the maximum rate at which fluid will be withdrawn from the transfer chamber. This requirement must also be met relative to the delivery of oxidant to the transfer chamber J'.

In using the invention, the pumps 180 and 180' are started, with the valves 174 and 174' in the open position to discharge propellant and oxidant to the tubular shells Q and Q' until they are filled. The actuating member 58 shown in FIGURE 7, and the corresponding actuating member 58' on the oxidant supply side of the invention, will be holding certain of the switches 40 and 40' in the closed position to complete an electrical circuit to a portion of the solenoids 12. Fluids will flow through the ports N and N' into the transfer chambers J and J' and the conduits 22 and 22' to valves 70 and 164 respectively. The valves 70 and 164 are initially in the closed position. Also at this time the valve 88 which controls flow of fluid from propellant tank 84 is in the closed position, together with valve 154 that controls flow of fluid oxidant from the tank 150.

When it is desired to initiate movement of the rocket engine C, the valve 70 is opened, and fluid flows through the conduit 76 to nozzle 104 as well as through space 102 to conduit 96, control valve 94 which is now open, and through conduit 92 to the discharge side of the pump 90. When fluid is discharged through valve 70, fluid flows through the conduit 74, T fitting 78 and conduit 82 to the suction side of the pump 90. Inasmuch as the fluid pressure in conduits 82 and 92 is substantially equal, there will be no tendency for the pump 90 to be rotated as a result of fluid pressure thereon. Concurrently, the valve 164 is opened and flow of fluid oxidant from the transfer chamber J' to the combustion chamber F occurs (FIGURE 6). Flow of fluid to combustion chamber F only occurs if valve 200 and control valve 192 are placed in the open position. The engine C is then supplied with propellant and oxidant from tanks R and R' at a rate sufficient to provide the necessary static thrust to cause engine C to move relative to the plates L and L'. As the engine so moves, the switches 40 and 40' are sequentially closed to cause valve plates O and O' to sequentially open and permit discharge of fluid through the ports N and N'. The supply of fluid propellants from tanks R and R' to the combustion chamber F will continue until the transfer chambers J and J' move out of contact with plates P and P'.

However, when the chambers J and J' move out of contact with plates P and P', there must be no cessation of flow of propellant and oxidant from the transfer chambers to the combustion chamber F. Therefore, before the transfer chambers J and J' move out of contact with plates P and P', the valve 140 is opened which permits flow of high pressure air from the tank 136 to the containers 128 and 132 to discharge the unstable chemical compound 130 and catalyst 134 into the steam generator 114. Steam flows through conduit 116 to the turbine 108, with the turbine in turn rotating shafts 110 and 112 to drive the pumps 90 and 106 respectively. In order that pumps 90 and 106 may be driven at their full operating speed prior to movement of the transfer chambers J and J' out of contact with plates L and L', the generation of steam as above described may start concurrently with the initiation of combustion of the propellant and oxidant in the chamber F. At a substantial time interval before the chambers J and J' move out of contact with plates L and L', valves 88 and 154 are opened to permit flow of fluid to the pumps 90 and 106 respectively. When valves 88 and 154 are opened, the valves 70 and 164 respectively are preferably closed. It will be apparent that inasmuch as the valves 88 and 154, as well as the valves 70 and 164 are carried aboard the rocket A, that the opening and closing thereof must be carried out by electrical means. The valves 88 and 154 are normally closed, and are preferably of an electrically operable type which when energized move to open positions and so remain even when de-energized, due to catch mechanisms (not shown) forming a part thereof.

Two insulated electrical contacts 210 and 212 are mounted on plate L and connected by electrical conductors 214 and 216 to junction points 218 and 220 in conductors 48 and 54 respectively. Two springs 222 and 224 are supported from rocket A in such positions as to be in slidable engagement with the surface of plate L on which contacts 210 and 212 are mounted. Springs 222 and 224 are connected to two electrical conductors 226 and 228, which in turn are connected to valves 88 and 154. When the rocket A has reached a predetermined position relative to plates L and L', springs 222 and 224 engage contacts 210 and 212, valves 88 and 154 are electrically energized, and moved to open positions where fluid propellant and oxidizer can be drawn from tanks 84 and 150 to the suction sides of pumps 90 and 106 and therefrom to combustion chamber F.

As previously mentioned, it is highly desirable that no cessation of flow of fluid propellant and oxidizer to the combustion chamber F occur when there is a transition in supplying these fluids from reservoirs R and R' to tanks 84 and 150 respectively. Accordingly, it is desirable that the valves 70 and 164 controlling flow of fluid propellant and oxidizer from reservoirs R and R' to combustion chamber F close after the valves 88 and 154 have opened, and fluids are discharging therethrough to the combustion chamber. This delay in the closing of valves 70 and 164 can be effected by using normally open electrically operated valves of a type that close when a normally open electrical circuit of which they form a part is closed. The valves 70 and 164, due to catch mechanisms (not shown) forming a part thereof, remain closed when the above mentioned circuit is opened.

To effect the delayed closing of valves 70 and 164, the circuit includes two electrically insulated contacts 240 and 242 mounted on plate L. Contacts 240 and 242 are connected by electrical conductors 244 and 246 to junction points 248 and 250 in electrical conductors 48 and 54 respectively. Two springs 252 and 254 are so mounted on rocket A as to engage contacts 240 and 242 when the rocket reaches a predetermined position relative to plates L and L'. Springs 252 and 254 are connected by electrical conductors 256 and 258 to valves 70 and 164. When the electric circuit to valves 70 and 164 is completed, the valves move to closed positions and remain so, with fluid propellant and oxidizer to the combustion chamber F thereafter being supplied exclusively from the containers 84 and 150. After valves 70 and 164 are closed as above mentioned, the valves 174 and 174' are preferably closed.

It will be recognized from the above description that when the rocket A moves beyond plates L and L', all of the valve members O and O' will be in sealing positions on ports N and N', and no further flow of fluid or oxidizer will take place from tubular shells Q and Q'.

It will be noted in FIGURE 6 that after pump 90 starts to supply fluid propellant to combustion chamber F, the discharge of fluid propellant continues through space 102, and the propellant acts as a coolant for the inner wall 100 of engine C. Any surplus fluid propellant delivered to nozzle 104 can recirculate back to the suction pump 90 through conduit 76, T fitting 72, conduit 74, T fitting 78 and conduit 82.

Although the present invention is fully capable of achieving the objects and providing the advantages hereinbefore mentioned, it is to be understood that it is merely illustrative of the presently preferred embodiment thereof and we do not mean to be limited to the details of construction herein shown and described, other than as defined in the appended claims.

We claim:

1. In combination, a body having a combustion zone wherein fluid propellant is burned to develop a thrust to propel said body at least initially along a predetermined fixed course, a fluid propellant supply device comprising: an elongate rigid member that extends along said course and parallel thereto, said member having a plurality of longitudinally spaced, fluid propellant discharge ports formed therein; fluid inlet means on said body that slidably and sealingly engage said member for sequentially establishing communication between said inlet means and each of said discharge ports; a fluid propellant reservoir; fluid conducting means connected to said reservoir and disposed adjacent said rigid member and communicating with said fluid discharge ports; a plurality of valve members that normally occupy first positions in which each of said valve members obstructs one of said discharge ports to prevent flow of said propellant therefrom, but each of which valve members is capable of being moved to a second position where said propellant can flow from said conducting means through said discharge port associated therewith; means for sequentially moving each of said valve members from said first to said second position as said body travels along said course to supply said propellant through said discharge ports to said propellant inlet means; and sequentially moving said valve members from said second to said first positions as said body and propellant inlet means pass thereby.

2. A fluid propellant supply device as defined in claim 1 wherein said reservoir is capable of holding a greater quantity of said propellants than that quantity thereof which will be consumed in said combustion zone as said body is propelled the length of said course, said fluid propellants conducting means comprises a tubular shell that extends the length of said elongate member and has a plurality of longitudinally spaced first openings formed therein which are transversely aligned with said discharge ports, and a plurality of transversely disposed tubular nipples are provided, each of which at all times provides communication between one of said openings and said discharge port in transverse alignment therewith.

3. A fluid propellant supply device as defined in claim 2 wherein each of said valve members is disposed in one of said nipples, a plurality of second longitudinally spaced openings are formed in said tubular shell opposite said first openings and in transverse alignment therewith, and a plurality of plates are provided, in each of which a bore is formed, as well as means for affixing each of said plates to the exterior surface of said tubular shell to cover one of said second openings; a plurality of cylinders affixed to the inner faces of said plates and transversely aligned with said first openings; a plurality of valve stems affixed to said valve members and extending transversely across said tubular shell through said cylinders and out said bores; a plurality of pistons affixed to said stems slidably and sealingly mounted in said cylinders, each of which pistons have an interior face slightly smaller in area than that of the interior face of said valve member for lessening the transverse force required to move said valve members from said first to said second positions against the hydrostatic head of said fluid propellant in said tubular shell, and said means for moving said valve members from said second to said first positions comprising a plurality of compressed helical springs disposed in said cylinders.

4. A fluid propellant supply device as defined in claim 3 wherein said means for moving said valve members comprise a plurality of cylindrical ferrous armatures mounted on the portions of said valve stems projecting from said bores, together with a plurality of solenoids in which said armatures are longitudinally movable, and mounting means for holding said solenoids in fixed positions relative to said tubular shell.

5. A fluid propellant supply system for a rocket engine including a combustion chamber and fluid injection means associated therewith through which a fluid propellant and a fluid oxidant are concurrently discharged to burn in said combustion chamber and develop sufficient thrust to propel said engine along a course comprising; first and second fluid transfer chambers supported in parallel spaced relationship from said engine, each of which chambers have a fluid inlet formed therein with the portion of said chambers surrounding said inlets defining a smooth surface; first and second fluid passage means connecting said first and second transfer chambers to said fluid injection means; first and second parallel elongate plates that extend parallel to at least the initial portion of said course said engine will travel, said plates being in longitudinal alignment with said first and second transfer chambers respectively, said plates having a number of longitudinally spaced fluid discharge openings formed therein, with said ports in said first plate being adapted to have said propellant discharged therethrough with said ports in said second plate being adapted to have said oxidant discharged therethrough, said first and second plates being slidably and sealingly engaged by said flat surfaces on said first and second transfer chambers respectively; first means for continuously supplying said propellant to said first ports; second means for continuously supplying said fluid oxidant to said second ports; first and second valve means for normally obstructing discharge of said propellant and oxidant from said first and second ports respectively; and means for actuating said first and second valve means to concurrently and sequentially move portions thereof from said obstructing positions to non-obstructing positions only when said fluid inlets of said first and second chambers are in communication therewith as said rocket engine moves relative to said first and second plates; and means for returning said portions of said first and second valve means that have moved to said non-obstructing positions into obstructing positions after said first and second transfer chambers have traveled thereby.

6. A fluid propellant supply system as defined in claim 5 wherein first and second reservoirs are provided in which said supply propellant and oxidant are stored, with said first supply means being a first tubular shell closed at a first end thereof and connected on the second end thereof to said first reservoir, said first shell at all times communicating with said first valve means, and said second supply means being a second tubular shell closed at a first end thereof and connected at the second end thereof to said second reservoir, said second shell at all times communicating with said second valve means.

7. A fluid propellant supply system as defined in claim 6 wherein said first and second discharge ports are sufficiently large in transverse cross section that said propellant and oxidant can be discharged therefrom to said first and second transfer chambers at a faster rate than that at which said propellant flows from said first and second fluid passages into said combustion chamber.

8. A fluid propellant supply system as defined in claim 7 wherein said first and second transfer chambers are sufficiently large in volume as to continuously supply said fuel and oxidant to said first and second passage means during the sequence of time intervals as said rocket engine travels along said course in which said first and second valve means obstructs communication between said first and second transfer chambers and one of said first and one of said second ports which previously supplied said propellant and oxidant thereto before said first and second valve means establishes communication between said first and second chambers and a first and second of said ports which heretofore has not supplied said propellant and oxidant to said first and second transfer chambers.

References Cited in the file of this patent
UNITED STATES PATENTS
2,962,934  Seidner _____ Dec. 6, 1960